UNITED STATES PATENT OFFICE.

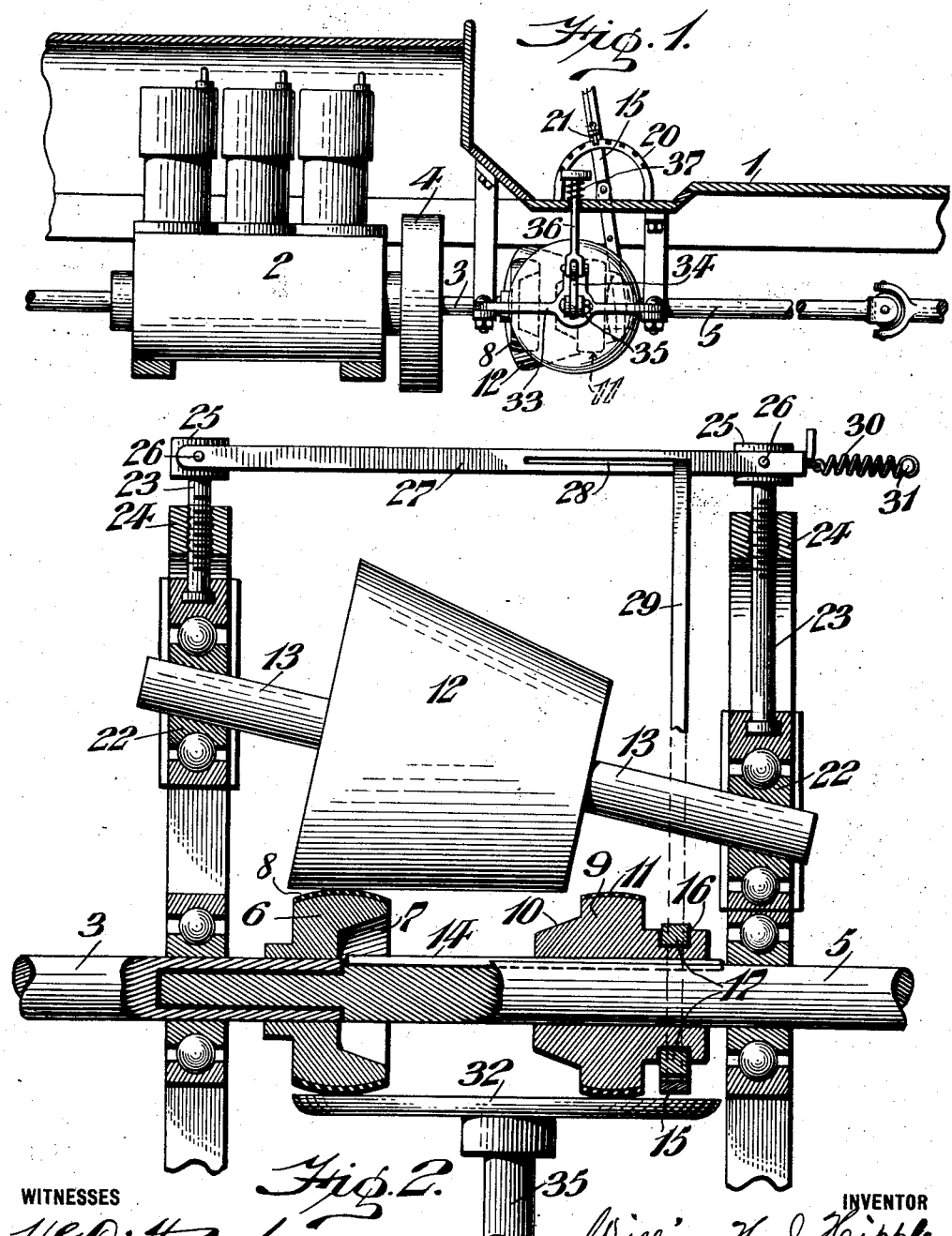

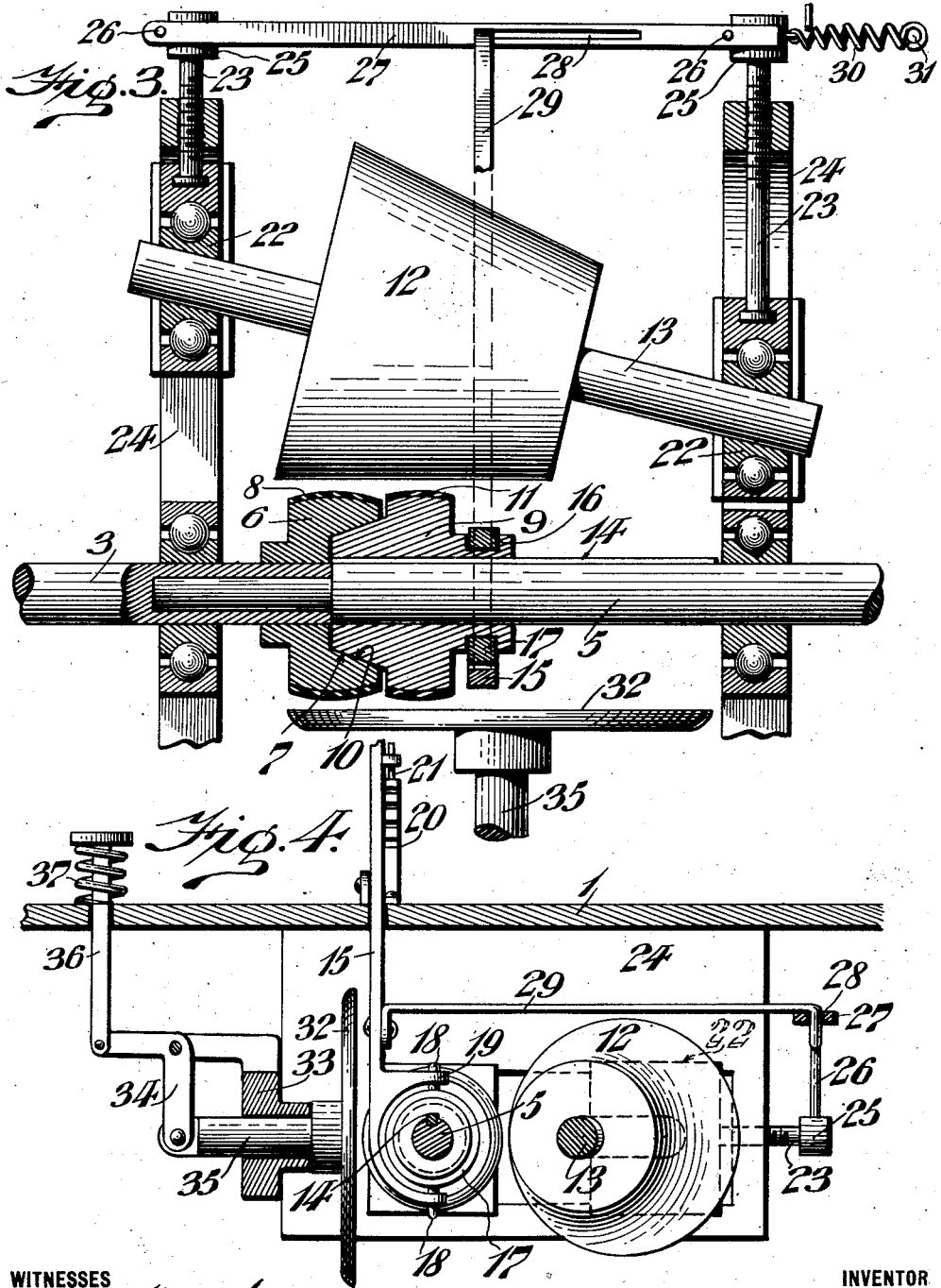

WILLIAM H. J. HIPPLE, OF PHILADELPHIA, PENNSYLVANIA.

VARIABLE-SPEED GEARING.

1,022,845. Specification of Letters Patent. Patented Apr. 9, 1912.

Application filed June 8, 1911. Serial No. 631,882.

*To all whom it may concern:*

Be it known that I, WILLIAM H. J. HIPPLE, a citizen of the United States, residing in the city and county of Philadelphia, State of Pennsylvania, have invented a new and useful Variable-Speed Gearing, of which the following is a specification.

This invention relates to a transmission mechanism and more particularly to a variable speed device for use in connection with automobiles, motor boats and the like wherein an internal combustion engine forms the source of motive power.

It has for an object to provide a speed changing mechanism whereby a large number of different speeds may be obtained and such speeds may be varied from a minimum to a maximum or from a maximum to a minimum as desired.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a device embodying my invention, shown partly in section, and in operative position. Fig. 2 represents a plan of the same, certain parts being shown in section. Fig. 3 represents a similar view showing the parts in operative position. Fig. 4 represents a side elevation of the same.

Similar numerals of reference indicate corresponding parts in the figures.

Referring to the drawings:—1 designates a portion of the body of an automobile or the like having suitable mounted therein a motor 2, preferably of the internal combustion type, having the main drive shaft 3 operatively connected thereto and carrying the usual fly-wheel 4. This shaft 3 is preferably apertured to receive the end of the driven shaft 5 and has fixedly secured thereto adjacent one end a friction member 6. This latter is provided with an internal cone face 7 and on its outer circumference carries a friction surface 8 of suitable material such as raw-hide or the like, whereby an efficient contact surface is provided.

9 designates a friction clutch member comprising an external cone face 10 adapted for engagement with the cone surface 7 of the member 6 and also having an outer circumferential surface 11 formed by suitable friction material as raw-hide or the like. It will be noted that both surfaces 8 and 11 are preferably convex and are adapted to engage with an intermediate cone 12 suitably mounted on the counter-shaft 13. Thus, as shown in Fig. 2, the intermediate cone 12 is in contact with the surface 8 of the friction member 6 and receives motion therefrom which it transmits to the clutch member 9 and thus varies the speed of the driven shaft 5. The clutch member 9 is preferably mounted for sliding movement on the shaft 5 and turns therewith through the medium of a key or spline 14. In the present instance, the clutch member 9 is operated by means of a lever 15 pivotally mounted on the car body and extending in a position to be shifted by the operator of the vehicle. The connection of this lever and the member 9, in the present instance, comprises a groove 16 in which a ring 17 is located, the latter being connected by suitable pins 18 or the like to the forked end of the lever 15. The usual segment 20 and latch 21 are provided to lock the lever in any desired position as will be apparent. It will thus be apparent by shifting lever 15 that the clutch member 9 may be brought into contact with the intermediate cone 12 and thus transmit power to the shaft 5 so that the latter rotates at less speed than the main driving shaft 3. If it is desired to directly connect the two shafts 3 and 5, the clutch member 9 is moved so that the surface 10 thereof engages with the surface 7 of the member 6 and at this time it becomes necessary to move the intermediate cone 12 out of engagement with the circumferential surfaces 8 and 11. This is effected, in the present instance, by mounting the counter shaft 13 in slidable bearings 22 each of which has connected thereto a threaded rod or stud 23 having threaded connection with a fixed part 24 of the frame. These studs 23 are each provided with a head 25 carrying a projecting pin 26 which are connected by a bar 27 the latter, in the present instance, being provided with a slot 28 of a length preferably approximating the travel of the clutch member 9 along the shaft 5.

29 designates a finger mounted for sliding movement within the slot 28 and fixedly secured to the operating lever 15, whereby when the latter is shifted a distance sufficient to bring the member 9 into engagement with the member 6, the finger 29 will abut the end of the slot 28 and shift the bar 27. This movement causes the studs 23 to rock thereby shifting bearings 22 and withdrawing countershaft 13 and the cone 12 from the surface of the two clutch members 6 and 9. This position is illustrated in Fig. 3 and the operation of the parts will be clear.

In order to return the shaft 13 to normal position with the intermediate cone 12 in engagement with the friction surfaces 8 and 11, a spring 30 is provided which is secured at one end to the bar 27 and at the opposite end to some fixed point as 31.

In order to provide means for reversing the rotation of the shaft 5, I preferably provide a friction disk 32 suitably mounted for rotation in the bearing 33 and adapted to have a sliding movement with respect thereto, the same being produced by means of a bell crank 34 connected to the stem 35 on the disk 32 and also secured to a treadle member 36 projecting through the floor of the car body 1 into position to be manipulated by the operator. This treadle is provided with a spring 37 for returning the parts to normal position with the disk 32 out of engagement with the friction surfaces 8 and 11.

In the operation of the device the motor 2 is understood to be running and if it is desired to change the speed of the driven shaft 5 the lever 15 is shifted so as to bring the clutch member 9 into engagement with the auxiliary cone 12, whereby the shaft 5 is rotated at the slowest speed and of course the farther the member 9 is moved toward the member 6 the faster the shaft 5 will be driven. As soon as the finger 29 engages the end of the slot 28, the bar 27 is shifted thereby drawing countershaft 13 away from the shaft 5 releasing the friction surfaces 8 and 11 and at the same time the cone surface 10 engages the internal cone 7 of the member 6 thereby furnishing a direct drive from the shaft 3 to the shaft 5. For reverse movement the treadle 36 is operated thereby bringing disk 32 into engagement with the surfaces 8 and 11 whereupon the friction members 6 and 9 are rotated in opposite directions and consequent reverse movement of the shaft 5 is effected.

It will now be apparent that I have devised a novel and useful construction of a variable speed gearing which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a motor, a shaft therefor, a friction driving member fixedly secured on said shaft, a driven shaft alined with said main shaft, a clutch member slidingly mounted on said driven shaft, an auxiliary cone mounted adjacent said members and normally engaging said driving member, and means to shift said clutch member into engagement with said auxiliary cone.

2. In a device of the character stated, a motor, a main shaft therefor, a friction driving member mounted on said main shaft, a driven shaft alined with said main shaft, a clutch member slidingly mounted on said driven shaft, an auxiliary friction cone mounted adjacent said members and normally engaging said driving member, means to shift said clutch member into engagement with said auxiliary cone, and means to move said auxiliary cone out of engagement with both said members at a predetermined time.

3. In a device of the character stated, a motor, a shaft therefor, a friction driving member fixedly secured on said shaft, a driven shaft alined with said main shaft, a clutch member slidingly mounted on said driven shaft, an auxiliary cone mounted adjacent said members and normally engaging said driving member, means to shift said clutch member into engagement with said auxiliary cone and means coöperating with the driving member to reverse the movement of said clutch member.

4. In a device of the character stated, a motor, a main shaft therefor, a friction driving member fixedly secured on said main shaft, a driven shaft alined with said main shaft, a clutch member slidingly mounted on said driven shaft, an auxiliary friction cone suitably mounted adjacent said members and adapted to normally engage said driving member, a lever adapted to shift said clutch member, and means operated by the movement of said lever at a predetermined time to shift said auxiliary cone out of engagement with said friction members.

5. In a device of the character stated, a motor, a main driving shaft therefor, a friction driving member fixedly secured on said main shaft, and provided with an internal cone face and an external friction surface, a driven shaft alined with said main shaft, a clutch member slidingly mounted on said driven shaft and having a cone surface adapted to engage said cone surface of said driven member and having a circumferential friction surface, an auxiliary cone member mounted adjacent said members, means to shift said clutch member to bring said latter circumferential surface into engagement with said auxiliary cone for a portion of the stroke of said member and to bring said cone surfaces into engagement at the end of said stroke, and means to withdraw said auxiliary cone from engaging position at the end of said stroke.

6. In a device of the character stated, a motor, a main driving shaft therefor, a friction driving member fixedly secured on said main shaft, and provided with an internal cone face and an external friction surface, a driven shaft alined with said main shaft, a clutch member slidingly mounted on said driven shaft and having a cone surface adapted to engage said cone surface of said driven member and having a circumferential friction surface, an auxiliary cone member mounted adjacent said members, means to shift said clutch member to bring said latter circumferential surface into engagement with said auxiliary cone for a portion of the stroke of said member and to bring said cone surfaces into engagement at the end of said stroke, means to withdraw said auxiliary cone from engaging position at the end of said stroke, and means coöperating with the driving member to reverse the direction of rotation of said clutch member.

WILLIAM H. J. HIPPLE.

Witnesses:
MICHAEL JACKSON,
THOS. HOUDUBACK.

Copies of this patent may be obtained for five cents each, by addressing the "Commissioner of Patents, Washington, D. C."